Sept. 2, 1952 R. G. TAYLOR, JR., ET AL 2,609,258
WELL FLUID HOLDING DEVICE
Filed Feb. 6, 1947 2 SHEETS—SHEET 1
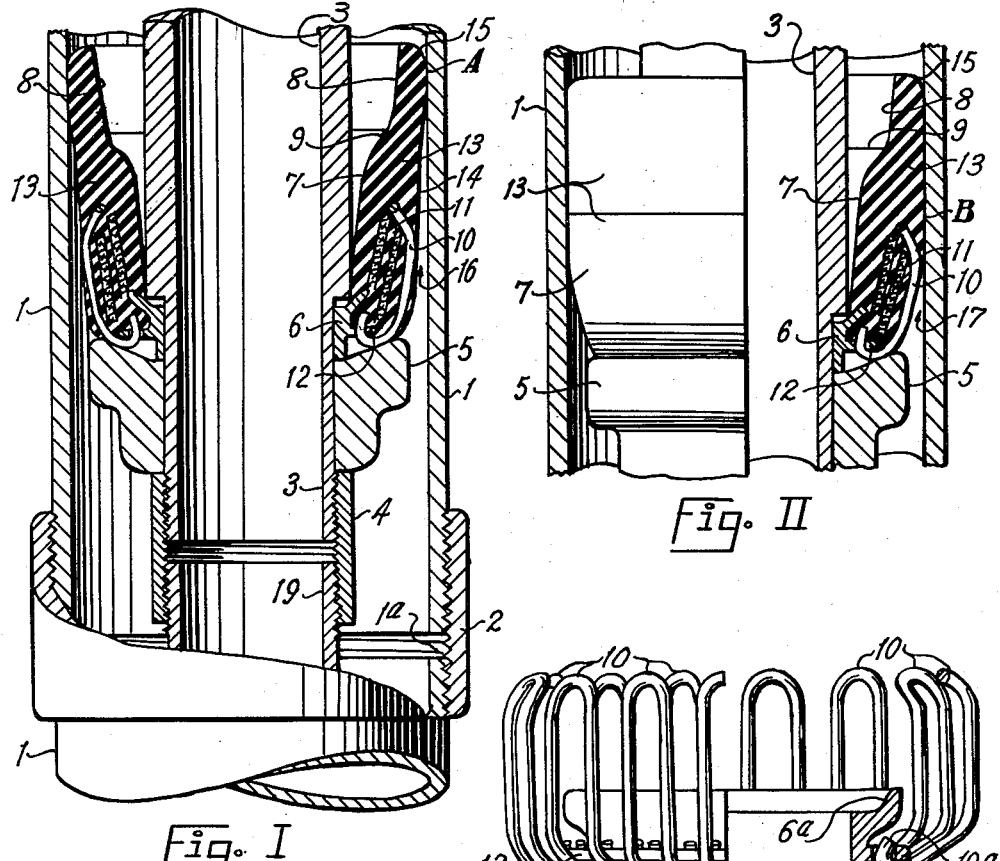
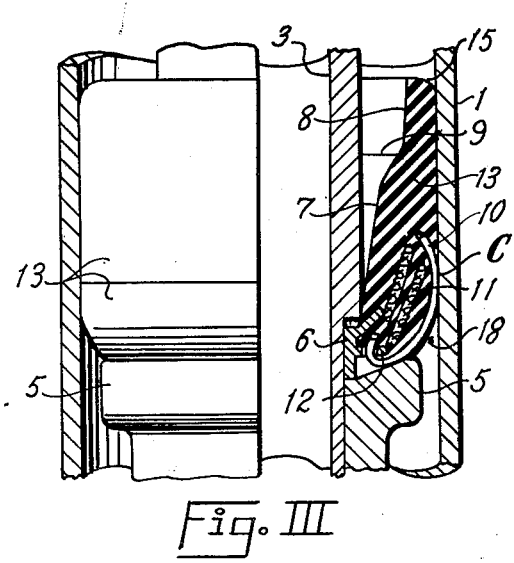
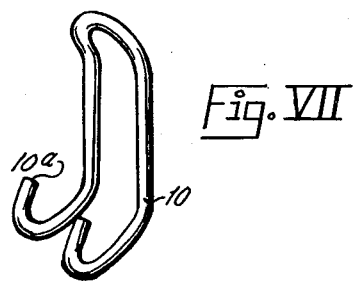
INVENTORS
RAYMOND G. TAYLOR, JR.
THOMAS B. LOSEY
BY
ATTORNEY Sept. 2, 1952 R. G. TAYLOR, JR., ET AL 2,609,258
WELL FLUID HOLDING DEVICE
Filed Feb. 6, 1947 2 SHEETS—SHEET 2
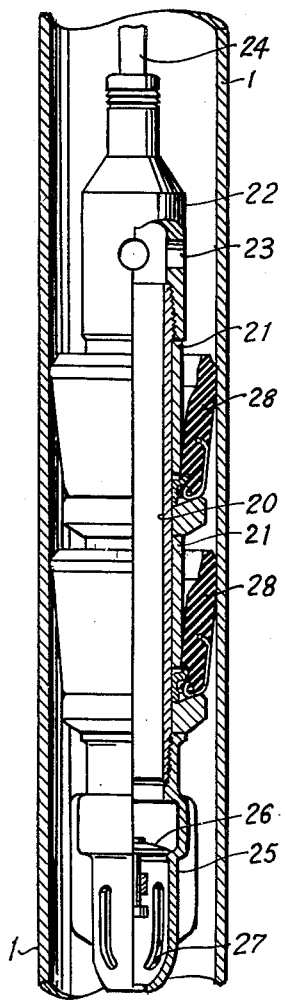
Fig. V
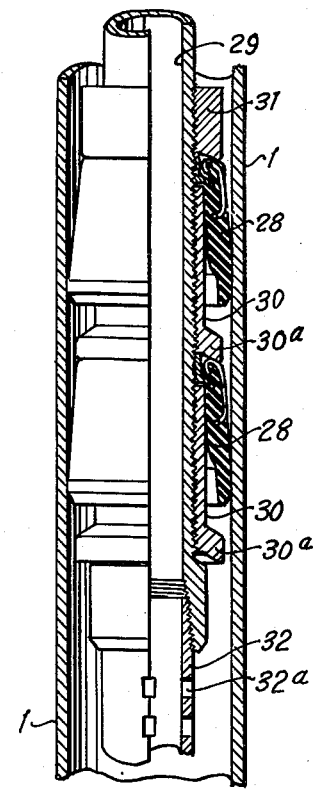
Fig. VI
INVENTORS
RAYMOND G. TAYLOR, JR.
THOMAS B. LOSEY
BY
*J. Austin Weir*
ATTORNEY Patented Sept. 2, 1952

2,609,258

UNITED STATES PATENT OFFICE 2,609,258

WELL FLUID HOLDING DEVICE

Raymond G. Taylor, Jr., and Thomas Belmont Losey, Dallas, Tex., assignors to The Guiberson Corporation, Dallas, Tex., a corporation of Delaware Application February 6, 1947, Serial No. 726,900

7 Claims. (Cl. 309—33)

This invention has to do with a well packing element and pressure retaining device; and it may be used either as a packer or as a swab. It is made for use in a cylinder or conduit having irregular walls, which may be found broken at intervals, and which are not smooth. Such wall conditions are found in the coupling regions of well pipe; and it is necessary that this device be made to safely pass such irregularities without hanging up thereon.

Because of its special design and construction this device will work satisfactorily and maintain a perfect seal in conduits having internal diameters of a considerable range of variability. One of these elements, of a given size, will operate properly in pipes having different internal diameters; and a complete seal against fluid pressures in pipes so varying can always be maintained with this device.

Old style well packers and swabs have always been purposely made to fit very closely into a pipe of a given size; and another element of a different size was required for a pipe of slightly different internal diameter. In short, the old style devices could be made to work only where there was a very close tolerance provided. Such old devices are more difficult of introduction into a pipe, because they fit so tightly. Heretofore, this has been considered necessary in order to maintain a seal between the moving element and the pipe wall. Such construction has always resulted in a great amount of abrasion, so that the packer or cup element is soon worn away to the point that it will no longer maintain a seal, and thereafter it becomes worthless.

Usually the entire outer wall length of old style cups fully impinges or contacts the walls of the pipe in which they are carried. This greatly increases friction and abrasion.

Leakage and abrasion have been such serious problems in the past that cups and packing elements have usually been made with straight side walls to allow greater contact surface. This resulted in a tremendous amount of friction and abrasion, and eventual reduction in efficiency. Later, to reduce the amount of distortion of a cup carrying considerable load and, apparently, in an effort to prevent some loss from abrasion, the full length of the cup wall has had reinforcing material added thereto. To a limited extent this resulted in a lessening of the impingement of the tight cup on the casing wall, and it also reduced frictional wear, because the reinforced cup did not expand so readily.

However, such reinforcing arrangements generally resulted in eventual failure to achieve the objects intended. This was so because the wires, or other reinforcing materials used, soon became distorted under load and finally let the cup conform to the shape of the tube through which it passed, even when it was not carrying a load. All such objections and difficulties have been overcome by the present invention, as will be made plain hereinafter.

Among the objects of this invention will be found those indicated above, and also the following:

(a) A cup having a tapered outer wall, with its greatest diameter at its open end.

(b) A cup having a relatively thick wall near its base, and a relatively thin wall near its open end, the change in wall thickness being abruptly made, so that there is a hinge action between these two sections of the wall (because of the different thicknesses).

(c) A cup having a relatively stiff and thickened wall section near its base, and a limber and thin wall section thereabove, the latter constituting a "limber lip."

(d) A cup having a reinforced wall in its lower part and a limber and unreinforced wall thereabove.

(e) A cup constructed with reference to the relative length of its thickened and stiffened wall, and the relative length of its thin and limber wall thereabove, the latter being approximately from ⅓ to ½ of the length of the former, and therefore approximately ¼ to ⅓ of the total length of the outer wall of the cup.

(f) A cup so constructed that when introduced into a casing there will be an initial seal only at or near its open end, and when load is placed on the cup, the effective engaging surface will gradually move down the side walls thereof in relation to the load, so that when fully loaded the cup impinges the casing along the lower side of the cup, the seal between the cup and the casing being maintained at all times, notwithstanding that the effective engaging surface moves downwardly along the casing and the cup wall in relation to the load carried by the cup.

(g) A cup having a relatively long life because it is more free to move within the casing and because the area of impingement to effect a seal between the outer wall of the cup and inner wall of the casing is greatly reduced.

(h) A cup so constructed that repeated loading of heavy pressures thereon and repeated unloading of such pressures will not cause such permanent distortion as to increase the friction of the cup moving within the casing.

(i) A cup of such shape and construction that when loaded and moved within a casing there is maintained between the two only the minimum frictional area necessary to perfect a seal preventing the passage of fluid therebetween.

(j) A tapered cup having so pliable a lip as to allow its successful use in tubes of varying internal diameters.

The construction and operation of this device will be better understood by making reference to the accompanying drawings in which:

Fig. I is a partially sectionalized elevation of a typical cup at rest in a casing or while it is being introduced therein without load.

Fig. II is a partially sectionalized elevation of the cup shown in Fig. I when subjected to low or medium pressure.

Fig. III is a partially sectionalized elevation of the cup shown in Fig. I when under high pressure.

Fig. IV is a partially cut-away elevation of one type of reinforcing material in a cup.

Fig. V shows a partially sectionized elevation of a swabbing assembly carrying two cups within a well casing.

Fig. VI shows a partially sectionized elevation of a casing pack-off unit including two inverted cups.

Fig. VII shows one form of reinforcing element in perspective.

In the drawings the various parts of the device are referred to by numerals, and like numerals indicate like parts. The packing element or swab cup 13 is introduced into the pipe or casing 1. Lengths of such casings are joined together with couplings 2; and such connection usually leaves a break, indicated as 1a, in the inner wall of the casing. Such rough and broken places within the casing or pipe soon chew up the ordinary cup or packing element which is forced to pass such joints under pressure.

The cup assembly of this device may be mounted on and carried by a tubular mandrel 3, 20 or 29; and the ends of the mandrels may be threaded to carry couplings. A standard pipe coupling 4 may be provided, which in turn may be threaded to ordinary well tubing 19. The mandrel carries a ring-like thimble 5, which supports or carries the cup element 13.

A bushing 6 is carried by the mandrel and held in place by the thimble; and the cup is firmly attached to this bushing. It may be molded thereto or affixed by using a reinforcing anchor 12 embedded in the cup wall, or otherwise connected. The bushing is arranged about any suitable carrying mandrel, of which mandrel 3 is an example. Mandrel coupling 4 may be used to secure and hold the thimble 5 in place. (See Fig. I.) Modified forms of mandrels are also shown in Figs. V and VI, that shown in the latter being provided with a threaded outer wall of considerable extent for securing parts of the assembly thereto, and the mandrel in Fig. V having outer walls which are straight and smooth.

The cup 13 is made of resilient and normally flexible material, such as a rubber composition or other plastic. However, the lower side walls 7 of the cup are relatively stiff and thick. The upper walls 8 of the cup, near its open end, are relatively thin and flexible. The change in wall thickness between these two sections is required to be abrupt, so that the junction therebetween constitutes a hinge 9. Such construction is of utmost importance, and must be thoroughly and well understood. It may be truly said that the upper section of this cup wall constitutes a "limber lip"; and the outer edge of this lip is rounded, as at 15.

The normal appearance of this cup, when not under load, may be likened to the frustum of a cone. It has a tapered outer wall 14; and the base of the cup is of smaller diameter than its open lip.

One of the most important results of the construction described immediately above is in the fact that when this cup is being run into the well hole, or being removed unloaded therefrom, there is the merest minimum of friction between the casing wall and the rounded edge of the limber lip of the cup. This edge constitutes the only point of contact between the cup and the casing during such operations. At such times the "limber lip" runs ahead of the ascending cup body, and acts like a flexible and feeling finger, to find its way over rough spots and couplings, threads and burrs, in the casing wall, especially at the ends of the casing or tubes through which the cup is required to pass. This "limber lip" literally "bounces" over such obstructions; and it will not hang up thereon, nor is there any excess amount of friction, abrasion or loss of power in moving a cup along roughened surfaces, such as was always found in the old style cups, or experienced before the advent of this invention.

The free running unloaded cup is shown in Fig. I, wherein the letter A indicates the region of initial impingement between cup and casing. Such region is an extremely narrow band running around the outer edge of the lip of the cup. Note the normal clearance between cup and casing, which space is indicated as at 16. Even when under a light load this band is not materially widened.

From the foregoing, it will be seen that this cup will not hang up when moved up and down within casings having roughened or broken side walls; and such a cup will have an exceedingly long life. It does not readily wear away by abrasion, because the friction is not great; and the contact surface which would allow friction is very limited. It requires less power to pull such a cup up out of a casing than would be the case if it clung to the walls of the casing with tenacity, as happens with old style cups.

The limber lip of this cup must be sufficiently long to bounce over obstructions, and to allow for a definite hinge action between it and the stiff base wall of the cup. Experience has taught that the limber lip should have a length of approximately one-third to one-half of the length of the thickened side walls of the cup below the lip. To put it another way, the limber lip is approximately one-fourth to one-third of the total length of the outer wall of the cup.

Another matter of great importance is the fact that this cup has a very long life even when under heavy load, and will not hang up or suffer excessive abrasion even when most heavily loaded. This fact arises directly from and by reason of the construction outlined above. Carefully studied field tests of the use of this invention have shown that: When the cup is required to lift a medium or light load (of approximately 500 pounds per square inch), the cup walls spread outward slightly for a little distance below the hinge point 9. Under such conditions the region of the "sealing band" on a medium load is found as at B, in Fig. II. This region is found to comprise only the minimum frictional area necessary to provide a seal preventing the passage of fluid between the cup and casing wall.

It must not be supposed that there is a great frictional area above the region indicated as at B; for such is not the case. There is practically no differential in pressure on the outside and on the inside of this lip. It is not a part of the effective sealing band. It no longer impinges the casing wall with sufficient force to prevent the passage of fluids therebehind. Such differential appears to be only the measure of the inherent strength of this part of the cup wall. This is proved by the experiment of inserting a tapered tool, such as a screw driver, between the limber lip and the casing wall, while the cup is loaded, as in Fig. II. The result of such test is that the load is still held intact and the seal in the region B is perfectly maintained, notwithstanding that the lip may be separated from the casing wall.

Therefore, when this cup is under a load, the frictional band necessary to maintain a seal between the outer wall of the cup and the inner face of the casing continues to be very narrow indeed, minimizing abrasion and frictional losses.

Equally important is the fact that the limber lip "feels its way" over obstructions in the ascending path of the cup, guiding the cup faithfully beyond them without hanging up in any fashion whatsoever. The load has been transferred to the thickened and relatively stiff lower side walls of the cup, and the limber lip simply acts as a pilot, safely steering the cup upwardly through the broken walls of a rough tube.

The normal clearance space between the outer wall of the tapered cup 13, when this cup is under little or no load, is indicated as at 16. The clearance space of a cup under medium load (of say 500 pounds per square inch) is indicated as at 17. This clearance is considerably reduced when the cup is under a very heavy load (say from 1000 to 8000 pounds per square inch); and when a cup is so loaded the clearance space has the appearance indicated as at 18.

The drawings and diagrams appearing as Figs. II and III indicate the action of the cup wall in expanding under load. It must be understood that this cup wall expansion moves progressively downward from the upper part of the cup to the lower part of the cup, as the load increases. The mechanics of this operation have been made clear immediately hereinbefore.

However, it is thought proper to further detail the action of the cup under very heavy load. Under such condition the region of the sealing band between the cup wall and the casing is indicated as at C. Again, this band has been found relatively narrow in width. The actual sealing region is located where this band is indicated; and the entire upper part of the cup wall is free, even including a limited length of the stiffened part of the cup wall. Under very heavy load the effective seal is actually maintained only in the lower part of the outer wall surface of the cup. The limber lip continues to be a free, jumping pilot which takes the cup safely up over roughened surfaces and obstructions.

It is not necessary that this cup wall be reinforced with material other than that from which the cup is made, because the thickening of the lower part of the cup wall greatly adds to its strength and stiffness. However, to provide a cup which may have an unusually long life and which may not be caused to suffer unduly under continued heavy load use, these cups may be otherwise reinforced. A reinforcing fabric, such as canvas or cord, or other suitable flexible reinforcing material, indicated as at 11, may be used in the lower part of the cup wall to strengthen it. When so used, such fabric is simply placed within the mold in which the cup body is formed of plastic materials, and the reinforcing, being properly spaced therein, becomes a part of the body wall, making it relatively strong and stiff.

Where desired, wire or metallic reinforcing, indicated as at 10, may be used. One way in which wire reinforcing may be very conveniently incorporated into the lower part of the cup wall is indicated in Fig. IV. Here will be seen reinforcing elements 10, made of wire, having roughly the shape of a hairpin, with a smooth curve at the top, and terminating in two hooks 10a at the bottom ends of these wires. Such reinforcing may be embedded within the material forming the cup by being properly spaced within the mold wherein the cup is made. To facilitate such disposition, and especially to anchor these reinforcing wires in place, an anchor ring 12 may be provided. It should be perforated at intervals so that the hooks 10a may be caused to pass through holes in the anchor, thus to secure the reinforcing in proper place and strengthen its attachment to the bushing 6. The anchor ring 12 may be attached to or made a part of bushing 6 in any convenient manner. Bushing 6 is preferably made as a removable ring-like attachment, designed to fit snugly around the mandrel. With such reinforcing construction it will be seen that the bushing and the anchor ring and the reinforcing material are all securely fastened together, with the lower part of the cup wall, as a single unit.

There are two advantages in the use of metallic reinforcing of the general character immediately indicated above. One is found in the fact that the lower part of the cup wall (which normally carries the heaviest part of any load) is greatly strengthened, and therefore its life is increased, along with its load carrying capacity. Another advantage is in the fact that the wire reinforcing will prevent permanent distortion of the lower side walls of the cup, because these wires themselves are resilient and will spring back to normal shape when the load is relieved therefrom; and suitable spring steel wire may be used to effect this desired end.

Reinforcing may be provided as shown in Figs. I, II and III, wherein it is indicated that both fabric reinforcing and metallic reinforcing are used conjointly, each to further strengthen the walls of the cup and increase its resistance to permanent distortion. Such construction makes the lower side walls of the cup relatively stiff, thereby rendering the limber lip of the cup still more limber, relatively speaking.

Where conditions of use and construction indicate the feasibility of such design, no reinforcing need be placed in these cups; and if preferred, only fabric reinforcing may be used; or only the metallic reinforcing may be used, this latter construction being indicated in Figs. V and VI.

If extra reinforcing material of some kind, such as just indicated, is not used, it is nevertheless necessary that the result of reinforcing be incorporated into the design and construction of this cup; and this is quite important. That is to say, the lower side walls of these cups must be made relatively stiff and strong. Making these walls thick will accomplish the desired ends (within reasonable limits). They must not expand readily under load and under pressure. At the same time, the upper side wall of this cup must be made relatively limber. It must be very flexible. Also, there must be a hinge-like action between the two sections, as indicated above. Therefore, in order to make certain these desired elements of construction, and these desired ends in use, especially in heavy duty cups, it is recommended that reinforcing material be used in the lower part of the cup wall. The bottom of the cup bears the heavier load and suffers the greatest stress. It should be made sufficiently strong to carry the load and to withstand the stress.

When reinforcing material is used, it must not extend up into the limber lip. Old style cups have tried such construction by reinforcing the entire cup wall; and the result is that when the reinforcing in the lower part of the cup has been distorted and pressed outwardly and expanded by pressure, there is invariably an inward deflection of the upper edge of the cup itself, because the reinforcing continuing into this upper section responds inwardly to the outward thrust of the same reinforcing wire or material in the lower part of the cup. This construction allows the undesirable deflection to become permanent. Once they are distorted in this fashion the old style cups will not even make an initial seal at their upper edges; and they will fail to pick up the load again after such deflection.

A special type of framework may be placed in the base of the cup by providing a projection, in an upwardly inclined lateral direction from the body of the bushing 6, so as to form a rigid reinforcing shelf 6a, embedded in the base of the material forming the cup. This will make the cup much more rugged, and capable of carrying a still greater weight. The element 6a constitutes a non-yielding rib-like extension of the bushing member, designed to better support the cup on the carrying mandrel.

The rubber cup, including its bushing, and such reinforcing as may be supplied thereto, is well supported on the ring or collar, known as thimble 5, which extends outwardly from the mandrel, around which it is placed. The construction shown affords a very strong shelf, having a face inclined slightly upwardly toward its outer perimeter, the better to support the weight of the cup and its load.

The cup assembly, and its supporting thimble are made to fit snugly about the outer face of the mandrel. There may be provided a slight recess in such outer face to receive these members, as indicated in mandrel 3, in Fig. I. In this case, a locknut may be screwed around the outer threaded surface of the mandrel below the thimble, to secure the latter in place. For such a locknut the coupling 4 may be substituted, as it will have the same effect of securing the cup assembly in the proper place on the outer face of the mandrel.

A smooth walled mandrel 20 may be used to carry the cup assembly and its thimble, in the manner indicated in Fig. V, wherein a pair of cups are mounted on a mandrel to constitute a swabbing unit. In this case an outer slipon sleeve 21 spaces the cups, one from the other, so as to exactly fix their relative positions and to securely hold them in such positions. Any number of swab cups may be thus placed in line to constitute a single swabbing unit, by making the mandrel 20 long enough, and by inserting as many sleeves 21 as may be desired, one between each two cups, and one above the last cup at the top. This last sleeve 21 will then be held in place by the use of a special coupling joint 22, provided with threads which cooperate with other threads on the upper end of the mandrel 20. When thus arranged, the lower face of element 22 will abut against and firmly secure the sleeve 21, which has approximately the same external diameter as the element 21, or a little smaller diameter.

The special coupling joint 22 is provided with a series of ports 23, through its side walls. These ports allow fluid in the casing to flow through the entire swabbing unit or assembly, while it is being lowered initially into the casing, or while it is being lowered to make effective another upward stroke to lift fluid, such as oil.

A cable, such as a wire cable 24, is fixed into the upper end of the special joint 22 for lifting the swab cups under load and for removing unloaded cups from a casing. Of course, a solid rod could be used for the pumping operation in place of the cable 24; or a tubular shaft or rod could be used for this purpose. However, it has been found most practical to use a wire cable on ordinary well swabbing operations, the cable being wound about a drum mounted and powered above the surface of the ground.

To complete the assembly of the swabbing unit, such as is shown in Fig. V, there is provided, as its lowermost part, a valve housing 25, in which may be carried a movable valve element 26, arranged to rest on a valve seat, which may be fashioned from the inner wall of the valve housing itself. This poppet type valve arrangement is quite satisfactory. However, most any other form of valve arrangement could be substituted for it, such as a ball type valve. In any event, the valve is to open upwardly to admit the upward passage of fluid when the swabbing assembly is descending the casing. Below the valve seat there are arranged suitable inlet ports 27, which permit fluid to enter the valve housing 25 and pass upwardly through the valve therein. The mandrel 20 is hollow, and it communicates with the valve carried below it, and the element 22 being hollow in its lowermost part, where ports 23 are provided, it will be seen that the flow of fluid through the swab assembly, while it is descending in the well or casing will be, first, into ports 27, through valve housing 25, around valve 26, upwardly through mandrel 20, into element 22, and out of ports 23.

When the swabbing unit is lifted upwardly in the casing, the valve 26 closes, and a load of oil or other liquid is carried in the cups 28. The head of fluid raised by each upward movement of the swabbing unit is discharged from the casing above the surface of the ground; and there it is admitted to storage tanks or other confining vessels.

Much of the foregoing discussion has had to do with the use of the described cup, and its associated mechanism, in the swabbing of an oil well. However, as earlier indicated in this specification, one of the most important and widespread uses to which this invention can be put is found in the packing-off of a well. The cups can be used as well packing elements by the very simple process of inverting them and inserting them in the casing, and placing them under such pressure as will confine fluids below the cups. A well packing assembly of upright cups can be placed at one level in the casing of a well, and a like but inverted assembly can be placed at another level therein; and the space between them can be safely and securely packed off. Packing of wells with this device is used to shut off the flow (and/or pressure) of fluids, such as gas, oil, water or other well fluid.

The operation and movement of the packing cups or element within the casing, when under no load, or when under medium load or heavy load, will be exactly as that described in the swabbing operation heretofore. The limber lip of the cup will find its way safely across broken places in the pipe walls, the sealing band around the external periphery of the cup will progress toward the base of the cup as the load thereon is increased, and the greatest weight of the load will be carried by the base of the cup and its supporting thimble. A typical well packing element is indicated in Fig. VI. Fluid may be allowed to flow through tubing 32, arranged above and below hollow mandrel 29, and communicating therewith, until the packing element is set in place in the casing. Thereafter such tubular conduits are closed to make the packing effective.

For packing a well (or for swabbing a well) special mandrel 29 may be provided. The outer walls of this mandrel, for a very long distance, are threaded to receive special threaded sleeve 30. This sleeve is provided at one end with a shelf 30a, to function in the same manner as the typical thimble 5, heretofore discussed. Thus, the element 30 is both a sleeve and a thimble, the former spacing the cups and the latter supporting them, in the usual way.

A confining ring 31 may be placed about mandrel 29, above the topmost cup 28, in the packing assembly, as disclosed in Fig. VI, thus securely holding the cup in place. The lowermost end of mandrel 29 may be threadably connected to a tubular extension, or to a length of tubing 32, which may be provided with ports 32a, as desired.

Any cup shown in any of the accompanying drawings or described in this specification may be used as a packing element (as well as for swabbing). The mandrel shown in Fig. I, or that shown in Fig. V, or that shown in Fig. VI, may be used to assemble and carry thereon one or a series of cups, either for the purpose of packing a well or for swabbing it. Any thimble construction disclosed herein may be used for either packing or swabbing operations.

The universal nature of the cup here disclosed, for either packing or swabbing, has been amply demonstrated by use. It is desired that there be recognized the fact that all advantages of the cups disclosed for use in swabbing will be found when these cups are used for packing. The limber lip of the inverted cup readily finds its way over obstructions in the wall of the casing; and there is a minimum of friction on the outer walls of the cup, regardless of the load carried thereby. The cup can be lowered into a casing with extreme ease for the purpose of packing; and it has a very long life. It very greatly resists permanent distortion, regardless of load and pressure thereon.

These desirable features arise because the cup is designed and built with a tapered side wall, with a very pliable lip at its open end, with a hinge action to the lip, allowing its flexure, and with a very stiff and stout side wall and base (whether specially reinforced or not).

It must be understood that reference to the top of a cup herein means the open limber-lip section of the cup wall; and reference to the bottom of the cup means its closed base end; and this is so whether the cups be shown or used in "upright" or "inverted" position. They are employed as well one way as the other.

There is a very great economic advantage benefitting the manufacturer, the jobber and the user of these cups, whether for packing or for swabbing; and this great advantage arises from the fact that a very small stock or inventory of cups will do for a multitude of jobs. Because the open cup lip is flexible and of slightly greater diameter than the remaining body of the cup (considering its tapered external wall), we find that one standard cup size will take the place of several conventional cups, which have heretofore been made more rigid and without the flexible lip.

In the past, old style cups have been made for each different size of casing. With this new invention one cup will satisfactorily work in three or four or more different sizes of casing. Casing and tubing and pipe may be found in various wall thicknesses and in various weights. The outside diameter of such tubular goods is constant. Therefore, the internal diameter of such tubes vary with their weights and wall thicknesses. Old style cups therefore had to be made in exactly the right size to fit every different wall thickness and every different weight of tubular goods in which it was to be carried.

An example of the use of this invention will suffice to make this point clear. When one of these new cups is made in a standard size of, let us say, $5\frac{1}{2}$ inches, then we find that it will work in $5\frac{1}{2}$ inch casing of 13 pound weight, and also of 15 pound weight, and also of 15.5 pound weight, and also of 20 pound weight. The same identical cup will also work in $5\frac{3}{4}$-inch casing of 22.5 weight, and of 25.2 weight. The example given is only for the purpose of making clear the advantage stated. This same advantage is found in every other size of cups made under this new invention.

This means that the manufacturer will need to employ less than half as many molds to carry a complete range of sizes to fit all pipe. The inventory in the hands of the manufacturer, the jobber and the user is cut by more than half, as compared to the conventional type of cup. This greatly reduces the amount of money invested in tools, in materials and in finished stock. From the user's standpoint, it has a very valuable advantage in that he has at all times a cup to fit whatever pipe he may be compelled to employ, regardless of its weight per foot; and he no longer has to buy and maintain a separate cup for every different pipe. In the national economy this means a great saving in labor and in freight and in time; and it minimizes vexation and delays in field operations.

We have presented a device for packing-off, holding, controlling and lifting well fluids within a casing or pipe having irregular wall surfaces; and the character, construction and arrangement of the device may well be summarized by saying that: The essential element of this invention is a plastic cup, a little wider at the top than at the bottom, the ascending outer wall being inclined slightly, especially when the cup is in repose, the wall consisting of two sections, one above the other; the lower wall section being made so relatively stiff and thick as to stoutly resist permanent distortion when under pressure, but capable of becoming slightly shorter under heavy pressure and of inclining slightly more to the vertical, the better to contact the inner face of the wall of a casing into which the cup may be introduced; the construction and arrangement of this lower section of the wall being such that only a narrow peripheral outer band thereof is required to effectively seal against the passage of fluid around the cup and within the casing, thus minimizing the area of friction and attrition; the said lower section of the wall being so constructed that it will return to its normal shape when relieved of pressure; the upper section of the cup wall being made much more pliable than the lower section, the upper section constituting a limber lip, having from one-fourth to one-third the length of the lower section, and the lip being approximately one-half as thick as the lower section, and not more than 60% as thick; the juncture between the two sections of the wall being such that there is a definite hinge-like action between these two sections; the construction and arrangement of the upper section being such that there is a minimum of friction between it and the casing wall even when the cup is heavily loaded; means provided for attaching the cup about the outer wall of a tubular mandrel so that it may be carried thereby; the mandrel being so arranged that it may be attached to and communicate with pipe or tubing which may be disposed above and/or below the mandrel, as conditions require; the mandrel being capable of attachment to a cable for lowering it into and raising it from a well; a shelf-like thimble of ring-like character provided about the mandrel and below the cup, the better to support the latter, especially when it is under load; means provided for maintaining two or more cups in spaced relation along the mandrel, so that multiple cups may be used when desired; and the entire cup and mandrel assembly being capable of use for either packing-off a well or for swabbing a well, all as explained in greater particularity hereinabove.

We claim:

1. In a well fluid holding device, a plastic cup having an outwardly inclined wall comprised of two sections, the thickness of the upper section being not more than 60% of that of the lower section, the upper section being of readily pliable character and the lower section being so stiff as to yield elastically only under heavy pressure, the cup being so constructed and designed that only the upper section will contact the walls of a casing into which the cup is introduced without pressure, and that the lower section will contact the casing when the cup is under heavy pressure so that said section alone will afford a seal sufficient to prevent the passage of fluid around the cup within the casing, and the wall being weakened at the line of joinder between the two sections whereby hinge action therebetween is provided.

2. In a well fluid retaining device, a vertically disposed cylindrical mandrel; a collar removably carried about the mandrel; and a resilient cup removably disposed about the mandrel and supported by the collar, the cup having a lip of pliable nature comprising a thin section of the cup wall, the said wall continuing therebelow to form a thick wall section of stiff character, the juncture between the two wall sections affording a hinge for the flexure of the thin section.

3. In a well fluid retaining device, a tubular mandrel; a thimble removably carried about the mandrel; and a resilient cup removably disposed about the mandrel and supported by the thimble, the outer wall of the cup being inclined to provide a mouth of greater diameter than that of the base, the cup wall being relatively thick in its lower part and abruptly changing to a thin section in its upper part to form a limber lip and allow a hinge-like flexure between these two parts of the wall.

4. In a device for packing and swabbing wells, a plastic cup having tapered outside walls providing a cup mouth of greater diameter than the base of the cup, the lower section of the wall of such cup being relatively stiff and of greater thickness than the upper section thereof, the said upper section being relatively limber, and the change in said thickness being sufficiently abrupt as to allow flexure between the said sections in the region of the change; a ring bushing carried in the base of the cup; a circular thimble arranged to support the cup; a tubular mandrel; and means to secure the cup and the thimble about the outer wall of the mandrel.

5. In a well fluid holding device, a tubular mandrel; a thimble disposed in collar-like relation around the mandrel; a resilient cup carried by the thimble and about the mandrel, the cup having a thick lower wall and a thin upper wall; and reinforcing material in the cup base and in the lower side wall thereof, so arranged therein as to maintain the outer line of said side wall in a position of inclination upwardly and outwardly from the base, the outer line of the upper side wall in said cup continuing in the angle of said inclination, said upper side wall being unreinforced and of pliable nature and so connected to the said reinforced wall as to be in hinged relation thereto.

6. In a well fluid retaining device, a tubular mandrel; a flared plastic cup encircling the mandrel and having upper and lower wall sections, the latter being relatively thick and abruptly decreasing in thickness to merge into the former and allow it to be hinged thereto, the length of the upper section being not less than ⅓ nor more than ½ of the length of the lower section and the thickness thereof being approximately ½ that of the lower section when the latter is heavily loaded; reinforcing material added to the lower section to materially increase its resistance to distortion under pressure, the upper section being unreinforced and yieldably responsive to pressure; and a shelf-affording thimble arranged as a collar about the mandrel and so constructed as to contact and support the base of the cup.

7. In a cup for holding well fluid, a body portion having a relatively thick wall; reinforcing material in such wall; an annular limber lip extending above said wall, said lip being relatively thin and unreinforced, and the juncture between wall and lip being so weakened as to allow hinge action therebetween, and the diameter of the lip being greater than the diameter of the body, and the outer face of the cup in relaxed position providing a continuous straight line extending each way from the said juncture and continuing for the greater part of the length of the members joined.

RAYMOND G. TAYLOR, Jr.
THOMAS BELMONT LOSEY.

REFERENCES CITED

The following references are of record in the file of this patent:

UNITED STATES PATENTS

| Number | Name | Date |
|---|---|---|
| 2,111,312 | Clark | Mar. 15, 1933 |
| 2,276,027 | Dick | Mar. 10, 1942 |
| 2,305,282 | Taylor, Jr. et al. | Dec. 15, 1942 |
| 2,325,556 | Taylor, Jr. et al. | July 27, 1943 |
| 2,352,812 | Taylor, Jr. | July 4, 1944 |
| 2,459,562 | La Brie | Jan. 18, 1949 |